(12) United States Patent
Furlan et al.

(10) Patent No.: US 8,456,537 B2
(45) Date of Patent: Jun. 4, 2013

(54) VIDEO CAMERA WITH MULTIFUNCTION CONNECTION PORTS

(75) Inventors: John Furlan, Belmont, CA (US); Ariel Braunstein, San Francisco, CA (US); Jonathan Kaplan, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 497 days.

(21) Appl. No.: 12/759,591

(22) Filed: Apr. 13, 2010

(65) Prior Publication Data
US 2010/0295960 A1 Nov. 25, 2010

Related U.S. Application Data (60) Provisional application No. 61/179,666, filed on May 19, 2009.

(51) Int. Cl.
*H04N 5/228* (2006.01)
(52) U.S. Cl.
USPC ............ 348/222.1; 348/207.1; 348/207.99

(58) Field of Classification Search
USPC .............. 348/222.1, 207.1, 207.99; 370/419
See application file for complete search history.

(56) References Cited

U.S. PATENT DOCUMENTS

| 2008/0031270 A1* | 2/2008 | Tran et al. | 370/419 |
|---|---|---|---|
| 2010/0177962 A1* | 7/2010 | Kalman | 382/167 |
| 2010/0188576 A1* | 7/2010 | Mizushima | 348/554 |

* cited by examiner

*Primary Examiner* — Yogesh Aggarwal
(74) *Attorney, Agent, or Firm* — Patterson & Sheridan, LLP (57) ABSTRACT

A digital device including a processor that includes a first unit configured to receive signals in accordance with a first communications protocol and a second unit configured to receive signals in accordance with a second communications protocol. The digital device further includes a data connector coupled to the processor and operable in accordance with the first communications protocol, a switch coupled to the data connector and configured to further couple the data connector to either the first unit or the second unit, and a sensor coupled to the switch, where upon activation of the sensor, a switching signal is transmitted from the sensor to the switch that causes the switch to uncouple the data connector from the first unit and couple the data connector to the second unit to make the data connector operable in accordance with the second communications protocol.

19 Claims, 9 Drawing Sheets

| | Audio In | Command/Control | Data In | Data Out | HDMI out | Power In | Power On/Off | Power Out | Video In |
|---|---|---|---|---|---|---|---|---|---|
| Bluetooth Adapter | | | | X | | | | X | |
| Wired Cradle | | | X | X | | X | | | |
| Demonstration Unit | | | | | | X | | | |
| External Battery Pack | | | | | | X | | | |
| Light | | | | | | | | X | |
| Microphone (wired/wireless) | X | | | | | | | | |
| Projector | | | | | X | | | X | |
| Remote Control | | X | | | | | X | X | |
| Security Camera | | | | | | | X | | |
| Storage (bi-directional) | | | X | X | | X | | | |
| TV Cradle | | X | | | X | X | | | |
| Underwater Case | | | | | | | X | | |
| Wireless Power | | | | | | X | | | |
| Wireless Webcam | | | | X | | | | X | |

*FIG. 5*

VIDEO CAMERA WITH MULTIFUNCTION CONNECTION PORTS

CROSS-REFERENCE TO RELATED APPLICATIONS

This application claims benefit of U.S. provisional patent application Ser. No. 61/179,666 filed on May 19, 2009, which is hereby incorporated herein by reference.

BACKGROUND OF THE INVENTION

Digital video cameras have become popular with the public. Digital video cameras enable a user to capture video footage, which can be viewed on a computer or television, uploaded to video sharing websites, or recorded onto a recording medium such as a digital versatile disc (DVD). Typically, transferring video footage from a camcorder to an external device such as a television or computer requires the use of a video cable and software to connect the digital video camera to the external device. Some models of digital video cameras provide a built-in Universal Serial Bus (USB) connector to facilitate transfer of video footage from the camcorder to the external device.

Different digital video cameras utilize different connectors for connecting to external devices. A few examples of standardized connectors are Universal Serial Bus (USB) complaint connectors, IEEE 1394 (Firewire) compliant connectors, High-Definition Multimedia Interface (HDMI) compliant connectors, and the like. Each of these standardized connectors provides different benefits and present different drawbacks. Thus, there is a need in the art for improved digital video cameras with multifunction input and output ports.

SUMMARY

According to embodiments of the present invention, video systems are provided. More specifically, embodiments of the present invention relate to methods and systems for operating a digital camcorder with a multifunction connector. Merely by way of example, embodiments of the present invention may be applied to a digital video camera with an HDMI connector and an independent connection sensor that converts the HDMI connector to a proprietary connector. The methods and techniques described herein utilize standardized equipment, but provide a user with the additional functionality associated with a proprietary connection. The methods and techniques can be applied to other applications as well, such as digital cameras, mobile phones, other electronic devices, and the like.

According to an embodiment of the present invention, a digital video camera is provided. The digital video camera includes a camera body, a video image sensor disposed in the camera body, and a memory coupled to the video image sensor and operable to store digital video footage. The digital video camera also includes an extendable arm permanently attached to the camera body, a first data connector permanently attached to the extendable arm, and a second data connector permanently attached to the camera body. The digital video camera further includes a switch coupled to the second data connector and a sensor coupled to communications circuitry. The communications circuitry is coupled to the switch.

According to another embodiment of the present invention, a method of operating a digital camcorder is provided. The method includes coupling the digital camcorder to a dock. The digital camcorder includes a first communications port. The method also includes placing a connection sensor in a connected state. The connection sensor is independent of the first communications port. The method further includes switching a plurality of communication channels in the digital camcorder from a first state to a second state based, in part, on the connection sensor being in the connected state.

According to yet another embodiment of the present invention, a digital video camera is provided. The digital video camera includes a camera body and a data connector disposed in the camera body. The digital video camera also includes a sensor disposed in the camera body and a switch in communication with the sensor. The data connector operates in a first mode in response to a first signal from the sensor and the data connector operates in a second mode in response to a second signal from the sensor.

Many benefits are achieved by way of the embodiments of the present invention over conventional techniques. For example, embodiments of the present invention provide increased functionality while providing full compatibility with conventional standardized connectors. Additionally, embodiments provide for communications between a docking station and the digital video camera independent of standardized connectors. These and other embodiments of the invention along with many of its advantages and features are described in more detail in conjunction with the text below and attached figures.

DESCRIPTION OF EXAMPLE EMBODIMENTS

Figure 1A:
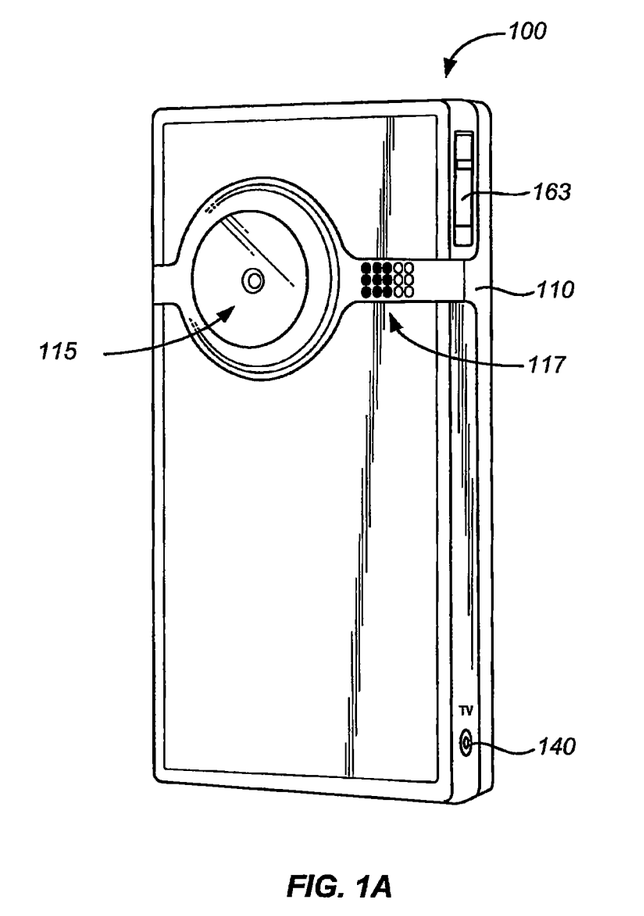
FIG. 1A is a simplified perspective drawing of the front of a digital video camera, according to an embodiment of the present invention.

FIG. 1A is a simplified perspective drawing of the front of a digital video camera 100, according to an embodiment of the present invention. The digital video camera 100, also referred to as a digital camcorder or camcorder, includes a camera body 110 that is designed to enclose the internal components of the digital video camera 100. Camera body 110 may also be designed to address such considerations as ease of use and durability. For instance, camera body 110 may be sized so that the digital video camera 100 can fit easily into a user's pocket. Camera body 110 may be manufactured from a hard plastic, metal, or other durable material to improve durability of the digital video camera. In one embodiment, camera body 110 is manufactured from a durable material in order to protect the internal components of the digital video camera 100 from physical shock, moisture, and other harmful elements.

Figure 2A:
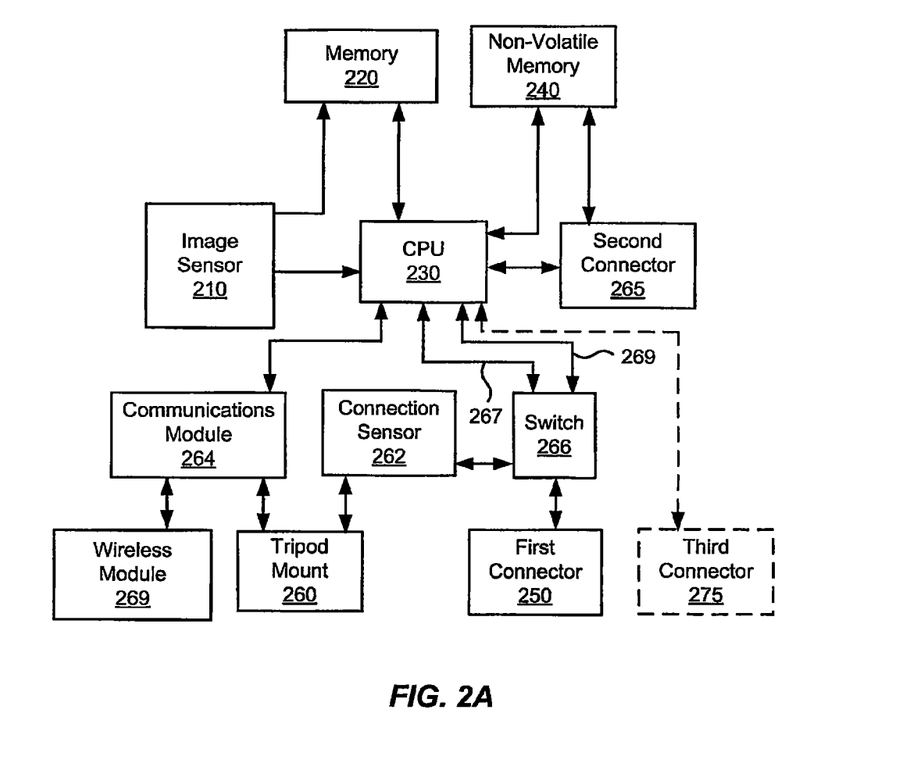
FIG. 2A is a simplified schematic diagram of a digital video camera, according to an embodiment of the present invention.

The digital video camera 100 includes a lens 115 that projects an image onto a digital video image sensor (not shown) located inside the camera body 110. Additional description related to the digital video image sensor is provided in relation to FIG. 2. The image capture components, including the lens 115 and the digital video image sensor, are capable of capturing digital video footage at resolutions and frame rates determined by the particular application, for example, standard definition (SD) video at 640×480 or high-definition (HD) video such as 720p, 1080i, or 1080p. Frame rates of 24 frames per second (fps), 30 fps, 60 fps, or the like are included within the scope of embodiments of the present invention. The microphone and audio sensor 117 capture the sound corresponding to the captured video footage.

The digital video camera 100 may be coupled to a television or other video monitor through television connector 140 in order to display still images and video clips on a television (not shown).

Figure 1B:
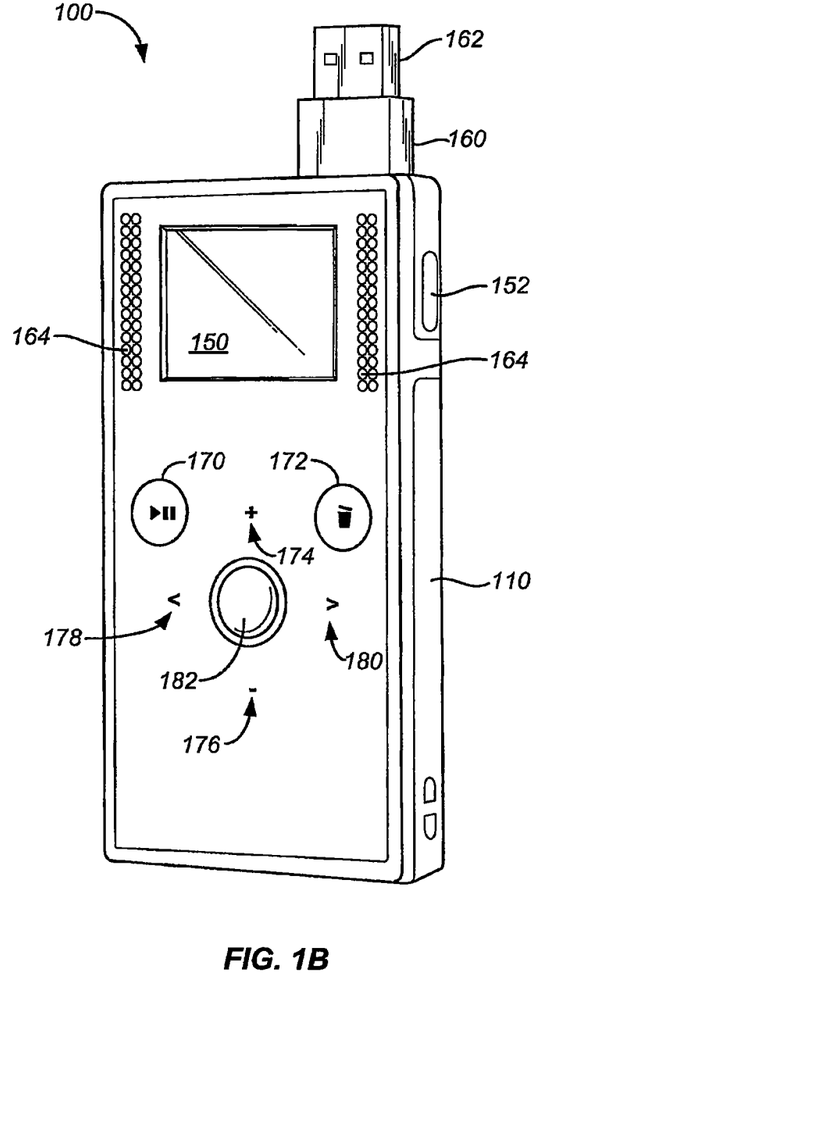
FIG. 1B is a simplified perspective drawing of the back of the digital video camera illustrated in FIG. 1A, according to an embodiment of the present invention.

FIG. 1B is a simplified perspective drawing of the back of the digital video camera 100 illustrated in FIG. 1A. The digital video camera 100 includes a number of user interfaces/controls as described below. As illustrated in FIG. 1B, the digital video camera 100 includes the camera body 110, a digital viewfinder 150, a data connector 162 attached to an arm 160, and audio speakers 164. The user interface buttons/controls include a power button 152, a play/pause button 170, a delete button 172, and a record button 182. The illustrated interface buttons also include a previous button 178, a next button 180, a zoom in/volume up button 174, and a zoom out/volume down button 176. In the illustrated embodiment, all of the interface buttons with the exception of the record button 182 and power button 152 are touch-sensitive capacitive buttons, but may be implemented in any technically feasible manner depending on the particular embodiment.

In the embodiment illustrated in FIG. 1B, the digital video camera 100 includes an arm 160 that is permanently attached to the camera body 110. A data connector 162 is permanently attached to the arm 160. The arm 160 and data connector 162 can retract into the camera body 110, or extend from the camera body 110 in response to actuation of switch 163 illustrated in FIG. 1A. In one embodiment, the data connector 162 complies with the Universal Serial Bus (USB) standard for data transfer. In another embodiment, the data connector 162 complies with the Institute of Electrical and Electronics Engineers (IEEE) 1394 interface standard. In FIG. 1A, the arm 160 and data connector 162 are illustrated in the retracted position; whereas, in FIG. 1B, the arm 160 and data connector 162 are illustrated in the extended position. When in the extended position, the arm 160 and data connector 162 comprise dimensions that provide sufficient clearance so that the data connector 162 can be inserted directly into an appropriate receptacle on an external device such as a computer system or a processing station. After the data connector 162 is connected to the external device, data can be transferred to and from the digital video camera 100 to the external device.

The digital viewfinder 150 allows a user to frame a scene to be captured as digital video footage. A user can also use the digital viewfinder 150 to view the scene while the capture is taking place. The display of the digital viewfinder 150 also allows the user to review video data that has been recorded in the non-volatile memory for data storage provided in the digital video camera. Thus, the digital viewfinder 150 is used to frame the subject prior to and during video capture, display video footage during video capture, and display video footage during playback, among other things. Control of the playback is provided through the user interface buttons described above, i.e., the play/pause button 170 and other buttons. The digital viewfinder 150 may be an active electronic component such as an active matrix or reflective liquid crystal display (LCD) serving as a high-quality multi-shade display capable of showing dual-tone or full color pictures and/or video segments.

In addition to video capture and display functionality, the digital viewfinder 150 can be used to visually communicate information, such as displaying current camera status, remaining recording time, battery level, low lighting conditions, and other similar information. Additionally, during initial operation, setup functions can be accessed using the user interface buttons and displayed on the digital viewfinder 150. Additional description related to digital video cameras is provided in co-pending and commonly assigned U.S. patent application Ser. No. 11/497,039, filed on Jul. 31, 2006, the disclosure of which is hereby incorporated by reference in its entirety for all purposes.

Figure 1C:
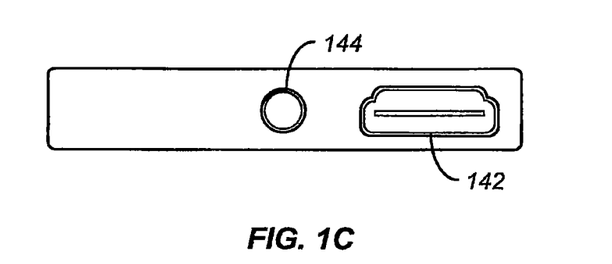
FIG. 1C is a simplified drawing of the bottom of a digital video camera, according to an embodiment of the present invention.

FIG. 1C is a simplified perspective drawing of the bottom of a digital video camera, according to an embodiment of the present invention. The digital video camera includes a first connector 142 (also referred to a the first data connector 142) and a tripod mount 144. The first connector 142 is typically a female socket configured to receive a cable supporting the particular standard on which the first connector 142 is compliant. As an example, an HDMI connector is used for purposes of illustration throughout the present specification. The tripod mount 144 is also provided in the bottom of the digital video camera. In some embodiments, as will be evident to one of skill in the art, the tripod mount 144 may be a threaded orifice configured to receive a screw extending from a portion of a tripod. Connection of a tripod to the tripod mount 144 is typically used to support and stabilize the digital video camera during operation.

As described more fully throughout the present specification, some embodiments of the present invention provide a connection sensor integrated with the tripod mount 144 that is responsive to insertion of objects into the tripod mount 144. Upon activation of the connection sensor, the digital video camera is able to modify the mode of operation of the camcorder. In a particular embodiment, the functionality of the first connector 142 is modified based on activation of the connection sensor. The integration of the connection sensor with the tripod mount 144 is not required by embodiments of the present invention and other structures for mounting the connection sensor in the digital video camera are included within the scope of embodiments of the present invention as discussed more fully throughout the present specification.

Figure 1D:
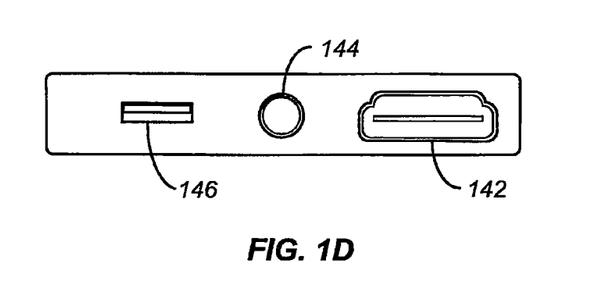
FIG. 1D is a simplified drawing of the bottom of a digital video camera, according to another embodiment of the present invention.

FIG. 1D is a simplified perspective drawing of the bottom of a digital video camera, according to another embodiment of the present invention. The digital video camera in this alternative embodiment includes not only the first connector 142 and the tripod mount 144 illustrated in FIG. 1C, but also an additional connector 146 (also referred to as a second connector 146 or a second data connector 146) on the bottom surface of the digital video camera. In the embodiment illustrated in FIG. 1D, the second or additional connector 146 is a USB socket configured to receive a USB cable. For example, the first connector 142 may be an HDMI connector and the second connector 146 may be a USB connector. Although an HDMI connector and a USB connector are illustrated in FIG. 1D, these particular connectors are not required by embodiments of the present invention and other connectors, either standardized, customized, or proprietary, are included within the scope of embodiments of the present invention.

Referring to FIG. 1D, the spatial orientation of the second data connector (e.g., the USB connector) 146 with reference to the first data connector (e.g., the HDMI connector) 142 is a pre-determined spatial orientation. Preferably, the spacing between the connectors is suitable for connection to connectors on the docking station. The specific spatial relationship between these two connectors can be considered, in some embodiments, to form a "proprietary connector." In one embodiment, independent of the sensor, the first data connector and the second data connector, when connected concurrently, can provide an indication to switch the functionality of the two standard connectors, resulting in one or more proprietary connectors. For example, when the USB and HDMI connectors illustrated in FIG. 1D are connected to the docking station, the USB connector can be used to send a signal to the switch that the HDMI connector is to be operated in a proprietary manner. Likewise, the HDMI connector could be used to send a signal to the switch that the USB connector is to be operated in a proprietary manner. Combinations using both connectors as a composite proprietary connector are also included within the scope of embodiments of the present invention. Thus, concurrent connection of the data connector and second data connector can result in at least one of the first data connector and/or the second data connector conforming to a proprietary standard for connecting peripheral devices.

Although the example presented above forms one or more proprietary connectors using the first data connector and the second data connector independent of the sensor, this example is not required by embodiments of the present invention and the sensor may be utilized in other embodiments to modify the operation of the first data connector or the second data connector. One of ordinary skill in the art would recognize many variations, modifications, and alternatives.

Figure 1E:
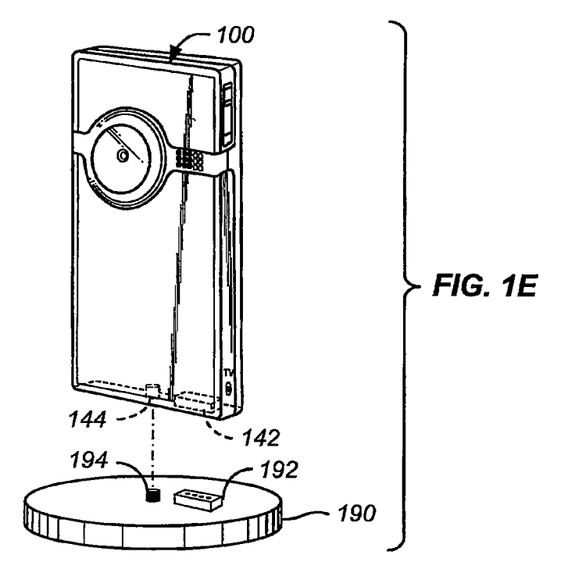
FIG. 1E is a simplified perspective drawing of the digital video camera illustrated in FIG. 1A positioned above a docking station, according to an embodiment of the present invention.

FIG. 1E is a simplified perspective drawing of the digital video camera 100 positioned above a docking station 190, according to an embodiment of the present invention. In order to mount the digital video camera 100 in the docking station 190 and/or insert the digital video camera 100 into the docking station 190, the connector(s) on the bottom of the digital video camera are aligned with corresponding connectors on the docking station 190. As illustrated in FIG. 1E, the tripod mount 144 is aligned with a stud 194 (or any other protuberance) extending from a surface of the docking station 190 and an HDMI connector 142 is aligned with the HDMI connector 192 extending from the surface of the docking station 190. The positions of the connectors are provided at predetermined locations in order to facilitate mounting. In some embodiments, a physical locking and release mechanism, such as a latching mechanism, is provided to maintain the connection between the digital video camera 100 and the docking station 190. In other embodiments, a friction fit between the digital video camera 100 and the elements of the docking station 190 results in the digital video camera 100 being maintained in a mounted position. Other elements can also be added to the docking station 190, such as a ring matching the bottom shape of the digital video camera 100 to enhance the friction between the digital video camera 100 and the docking station 190 during connection. One of ordinary skill in the art would recognize many variations, modifications, and alternatives.

Figure 1F:
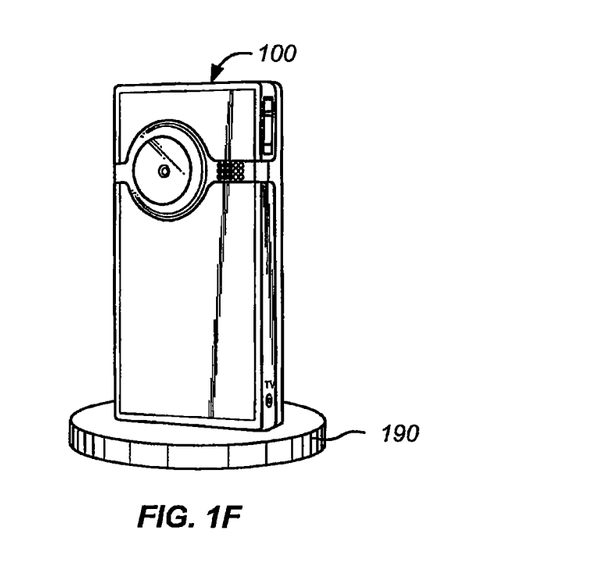
FIG. 1F is a simplified perspective drawing of the digital video camera illustrated in FIG. 1A mounted on the docking station, according to an embodiment of the present invention.

When the digital video camera 100 is inserted into the docking station 190, the first connector 192 on the docking station (e.g., an HDMI connector) may be inserted into the first connector 142 (e.g., an HDMI socket) on the digital video camera 100 and the stud 194 on the docking station 190 will be inserted into the tripod mount 144 on the digital video camera 100. If an additional (e.g., a third connector) is provided on the digital video camera 100, then a matching third connector could be provided on the docking station 190. In some embodiments, sliding the digital video camera 100 into the docking station 190 may provide for an electrical connection as well as a communications connection between the digital video camera 100 and the docking station 190. Additionally, an indication that docking has occurred can be provided, which will be explained in additional detail in the description that follows. FIG. 1F is a simplified perspective drawing of the digital video camera 100 mounted on the docking station 190, according to an embodiment of the present invention.

FIG. 2A is a simplified schematic diagram of a digital video camera, according to an embodiment of the present invention. The digital video camera includes an image sensor 210 (i.e., a video image sensor) that is in communication with memory 220 and a central processing unit (CPU) 230. In various embodiments, the image sensor 210 may be a Complementary Metal Oxide Semiconductor (CMOS) sensor or a Charge Coupled Device (CCD). In one embodiment, the image sensor 210 is at least capable of operation between night-time or dusk conditions and brighter light conditions such as 10 lux to 10,000 lux, where 1 lux is a measure of illumination equivalent to 1 lumen per square meter. The image sensor may be capable of operating in lighting conditions dimmer than 10 lux and brighter than 10,000 lux. The image sensor may also contain an ASIC to provide several optional features such as automatic exposure adjustment, automatic white balance, and automatic gamma compensation.

Signals from sensor 210 are provided to CPU 230. The CPU 230 can be a micro-controller, an ASIC, or other suitable processor. In one implementation, the video frames from the image sensor are in the form of RAW video frames. In the CPU 230, also referred to as a processor, image processing and/or other logic is used to process the stream of data that is generated by the image and audio capturing components and transform the captured video content (e.g., the RAW video data) to useable formats in pre-defined file structures. The sensor data provided to the CPU 230 is thus processed by an image processing engine provided as part of the CPU 230. Additionally, the CPU 230 utilizes memory 220, which contains one or more memory buffers during image processing operations. The memory 220 may be a dynamic random access memory (DRAM) (e.g., double-data-rate synchronous dynamic random access memory (DDR SDRAM)). The data is passed to/from CPU 230 and memory 220 during the image processing operations.

The CPU 230 may execute firmware instructions stored in memory 240 (e.g., a non-volatile memory) and copy the instructions to memory 220 for execution. The CPU 230 also controls the operation of the digital video camera 100. As discussed above, the CPU 230 may also use portions of memory 220 (e.g., buffers) to convert the raw data into captured video content in a proprietary file format or a standard video file format. Compression logic is typically used to compress the video data prior to the storing of the captured video data in the memory 240. The compression logic may use video and audio compression techniques such as Moving Pictures Experts Group (MPEG), MPEG-1, MPEG-2, MPEG-4, Motion Joint Photographic Experts Group (M-JPEG), Pulse Code Modulation (PCM), similar compression standards, or variants thereof. Such processing can include encoding or transcoding.

The compression logic may compress video and audio data by compression of composed video images, compression of three video channels, red, green, blue, (RGB), compression of raw sensor data in separate video channels, red, green-one, blue, green-two (R, G1, B, G2), down sampling the framerate of a video stream, or by conducting other similar compression techniques.

The internal memory components are used to both store the stream of video data as well as to develop the stream of video data. The internal memory components are also used during execution of code necessary to operate the digital video camera 100. Digital video camera 100 may contain multiple types of internal memory components, each type customized for a different purpose and cost. The two main types of internal memory may include volatile memory, such as synchronous dynamic random access memory (SDRAM), dynamic random access memory (DRAM), and non-volatile memory, such as flash memory and write-once memory. Non-volatile memory for data storage, such as a portion of a hard disk or a flash memory module and/or non-volatile memory for firmware and/or settings, is an example of non-volatile memory. Volatile memory for data processing and volatile memory for code execution are examples of volatile memories.

The non-volatile memory for data storage (e.g., memory 240) may be used in the digital video camera 100 to store any type of data. For example, the non-volatile memory may be used to store digital video footage captured using the digital video image sensor 210, thumbnail files associated with digital video files, or a resident software application. The non-volatile memory may also store still photo files, audio files, or any other type of data. In one embodiment, the non-volatile memory may include non-volatile memory units, such as 512 megabyte (MB) NAND flash memory modules, 1 gigabyte (GB), 2 GB, 4 GB, 8 GB, 16 GB, 32 GB, 64 GB, or other types of flash memory modules, so that the contents of the non-volatile memory are preserved even when no power is being supplied to the non-volatile memory. The non-volatile memory may also utilize storage technologies besides flash memory technology. For instance, the non-volatile memory could also be implemented by a hard disk drive or optical media such as a writable compact disc (CD) or DVD. In one embodiment, the non-volatile memory may be removable from the digital video camera 100. A user can then change the capacity or the content of memory available to the digital video camera 100. In other embodiments, the nonvolatile memory may not be removable from the digital camera 100. In a digital video camera 100 having a non-removable non-volatile memory, the use of the digital video camera 100 is simplified because non-volatile memory may typically be available for storage of digital video footage or other data.

The digital video camera includes several connectors, also referred to as data connectors, to provide for communication between the digital video camera 100 and external devices. A first connector 250 is provided as illustrated in FIG. 2A. In one embodiment, the first connector 250 is the HDMI connector 142 illustrated in FIG. 1C and FIG. 1D. In this embodiment, the first connector 250 complies with the HDMI specifications for transmitting uncompressed video data. The digital video camera 100 also includes a tripod mount 260, as illustrated by reference number 144 in FIG. 1C and FIG. 1D.

To provide for additional communication channels between the digital video camera 100 and external devices, the digital video camera 100 also provides a second connector 265. The second connector 265 corresponds to data connector 162 in some embodiments. For example, the second connector 265 may comprise a USB connector. Thus, in addition to an HDMI interface, a USB interface is provided in some embodiments to enable data transfer to/from the digital video camera 100 using one or both of the provided interfaces. In the embodiment illustrated in FIG. 2A, a third connector 275 is provided. The third data connector 275 is an additional USB connector 146 provided in the bottom surface of the digital video camera 100. In embodiments utilizing this optional third connector 275, the USB connection between the docking station and the digital video camera 100 can be used in place of or in addition to the second data connector 265.

The tripod mount 260 is in communication with connection sensor 262, enabling the digital video camera 100 to sense that a connection has been established between a docking station 190 and the digital video camera 100. When the connection stud 194 on the docking station 190 is inserted into the tripod mount 144 on the digital video camera 100, connection sensor 262 is activated and sends a signal to switch 266 to indicate that a connection has been established between the digital video camera 100 and the docking station 190. Thus, referring to FIG. 2A, the arrows between the tripod mount 260 and the connection sensor 262 do not necessarily represent a data connection, but a relationship between these elements. As illustrated in FIGS. 1E and 1F, mounting of the digital video camera 100 in the docking station 190 results in the first connector 250 making connection (e.g., the HDMI socket) with a matching connector (e.g., an HDMI connector) with communications circuitry provided in the docking station 190. Additionally, insertion of the connection stud 194 into the tripod mount 144 provides an independent indication of the connection between the digital video camera 100 and the docking station 190. As described more fully below, the independent indication of the connection is used to modify the functionality of the first connector 250, providing for either the standard use of the connector (e.g., operation in accordance with the HDMI standard) or a non-standard use of the connector (e.g., operation in accordance with a propriety format).

Although FIG. 2A illustrates that the connection sensor 262 is in communication with the tripod mount 260, this embodiment is merely one implementation and the connection sensor 262 can be configured to detect a connection between the digital video camera 100 and the docking station 190 in other ways. For example, a wireless connection could be established by integration of an radio frequency identification (RFID) system into the digital video camera 100 and docking station 190. In this RFID implementation, the connection sensor 262 in the digital video camera 100 would detect connection. After connection, a wireless communications link could be established between the docking station 190 and the communications module 264 and data could be transmitted to and from the digital video camera 100 and the docking station 190. Other wireless communications systems are also included in the scope of embodiments of the present invention. Thus, although a connection sensor 262 integrated with the tripod mount is illustrated, embodiments of the present invention are not limited to this particular embodiment.

In the embodiment illustrated in FIG. 2A, a communications module 264 is coupled to the tripod mount 260, enabling a communication channel to be provided between the digital video camera 100 and the docking station 190 (e.g., through the physical mechanism of the tripod mount 260). The stud 194 on the docking station 190 can make electrical contact with a portion of the tripod mount 260, another electrically conductive structure inside the digital video camera 100, or the like to provide a "wired" communications path (e.g., a low-bit rate channel). Other configurations are included within the scope of embodiments of the present invention in which the communications module 264 in the digital video camera 100 is connected to a communications module 195 in the docking station 190. The connection through the stud 194 and tripod mount 144 are just one example and other physical media can be used in other embodiments. One of ordinary skill in the art would recognize many variations, modifications, and alternatives.

In addition to the wired communication paths between the docking station and the digital video camera 100, a wireless module 269 is provided in some embodiments to enable wireless data transfer between the docking station 190 and the digital video camera 100. One of several wireless communication protocols can be utilized. The wireless communications can be performed in addition to or in place of the wired communications between the docking station 190 and the digital video camera 100.

In some embodiments, in addition to providing a communications channel independent of the first connector 250, mounting the digital video camera 100 in the docking station 190 may activate connection sensor 262, which, in turn, activates switch 266. The switch may effectively convert the standard connector used as the first connector (e.g., the HDMI connector) into a proprietary connector. As an example, the HDMI standard utilizes several different types of connectors, all having a 19-pin configuration. According to the HDMI standard, each pin serves a predefined function. The switch 266 may convert the function of one or more of the various pins of the first connector 250 as appropriate to a proprietary standard. Thus, fewer of the pins may be used for communication functions. Therefore, standard HDMI connectors and sockets can be utilized, but the communications functions will not be performed using the protocols defined by the standard. Thus, the independent indication that a connection has been made will effectively convert the standard connector into, a proprietary connector.

As an example of different functionality provided by the effective conversion to a proprietary connection, power for recharging batteries in the digital video camera 100 can be provided using wires in an HDMI cable that are typically used for other purposes. Moreover, video at a lower bandwidth than that supported by the HDMI specification can be transmitted to and/or from the digital video camera 100. This may utilize fewer pins than that used in transmitting high-definition video according to the HDMI standard. The unused pins can then be used for other functionality as appropriate to the particular application.

When the digital video camera 100 is operated in a non-connected mode (e.g., the connection sensor is not activated), the first connector 250 may provide a connection in which the switch 266 operates in a "pass through" configuration, passing the signals from the first connector 250 to the CPU 230 in accordance with the standard applicable to the first connector 250. For an HDMI connector, the HDMI signals may pass to and from the CPU 230, providing for video transmission from the digital video camera 100, through an HDMI cable to a television, computer, or the like. This connection is illustrated by data path 269 in FIG. 2A. Data transmission from an external source to the digital video camera 100 can also be performed using the HDMI cable as will be evident to one of skill in the art. Thus, for a user of the digital video camera 100, the normal functionality associated with the first connector 250 and its standard is available.

When the digital video camera 100 is operated in a connected mode, the switch 266 may transfer the data communications to data path 267, which interacts with the CPU 230 in accordance with a proprietary protocol. The data path 267 may be used to communicate through the first connector 250, but using one or more of the pins of the first connector 250 in a non-standard and proprietary manner. Thus, the activation of the connection sensor 262 actuates the switch 266, resulting in a modification of the output and/or operation of the digital video camera 100. In some embodiments, the first connector 250 is referred to as a multifunction or dual-use connector since the operating parameters of the connector are modified to one of several possible parameter spaces depending on the connection state of the digital video camera 100.

According to embodiments of the present invention, the benefits of a custom connector are made available, but without having to implement a custom connector on the digital video camera 100. For users, no additional cables associated with a custom connector will have to be purchased since the standard cables associated with the first connector are utilized. Thus, multifunction characteristics are provided using a standard connector. One of ordinary skill in the art would recognize many variations, modifications, and alternatives.

After connection of the digital video camera 100 to the docking station 190, data communications between the docking station 190 and the digital video camera 100 may enable control of the digital video camera 100 through the docking station 190. As an example, a remote control for the digital video camera 100 could transmit commands to the docking station 190, which would then pass the commands through the communications path established through the tripod mount 144. Control of video playback, actuation of menus in the digital video camera 100, and the like may be provided through this communications path. Because these commands may involve a low data rate, the communications path through the tripod mount 144 can be used for control while video playback and other higher data rate communications may be performed through the first connector 250 using a standard protocol (e.g., HDMI) or a non-standard, proprietary protocol.

It should be noted that control of the switch 266 is not limited to actuation using the connection sensor 262. In one embodiment, after connection, data could be communicated from the docking station 190 to the communications module 264 to return the switch 266 to the pass-through configuration, restoring the standard functionality to the first connector 250. Additionally, using a user interface on the digital video camera 100, the similar configuration could be selected by a user, returning the switch 266 to the pass-through configuration. Thus, although embodiments described herein automatically activate the switch 266 in response to actuation of the connection sensor 262, this implementation is not required by other embodiments of the present invention and other modes of operation in which the switch 266 is activated based on inputs other than from the connection sensor 262 are provided by embodiments of the present invention.

Operating in a docked mode, the digital video camera 100 can transmit a video signal to the docking station 190 using data path 267. This video signal, which may be a stripped-down version of a standard video signal and use only a subset of the pins provided by the first connector 250, could then be up-converted to a standard video signal by a processor present in the docking station 190. Thus, after mounting the digital video camera 100 in the docking station 190, operation of the digital video camera 100 can provide a video signal to the first connector 250 that is either in the format associated with the first connector 250 (e.g., HDMI format) or in a format that is up-converted or otherwise processed by the docking station 190 into the standard associated with the first connector 250. This design may provide a user with not only the standard functionality associated with the first connector 250, but also functionality provided by the proprietary standard associated with the digital video camera 100. As an example, if the first connector 250 is an HDMI connector, then the digital video camera 100 can be mounted in the docking station 190 and video can be played on a television connected to the docking station 190. The video can be transmitted using data path 267 in a first format (e.g., not HDMI format), using some portion or all of the pins provided by an HDMI connector, and then converted in the docking station 190 to an HDMI signal, which may then be transmitted to a TV or other display device. Alternatively, switch 266 could be deactivated so that data path 269 is used to transmit an HDMI signal from the CPU 230 to the docking station 190 using an HDMI connector. Thus, depending on the operating conditions, proprietary and standard functionality is provided using standard connectors and the components of the digital video camera 100.

Figure 2B:
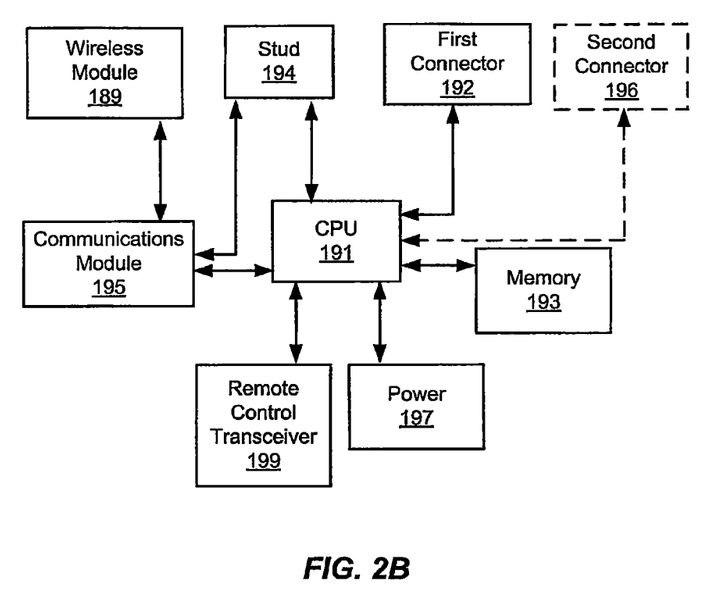
FIG. 2B is a simplified schematic diagram of a docking station, according to an embodiment of the present invention.

FIG. 2B is a simplified schematic diagram of a docking station, according to an embodiment of the present invention. The docking station includes a housing including and supporting a number of components. The docking station includes a CPU 191 coupled to memory 193 and power source 197. First connector 192, stud 194, and optional second connector 196 are mounted in or on one or more surfaces of the docking station. The connector(s) and the stud 194 are in communication with the CPU 191 and other components. The docking station also includes a communications module 195 that can communicate with a digital video camera coupled to the docking station either through the stud 194, through another wired connection (not illustrated) or through wireless module 189. Thus, in addition to data transfer through the first connector 192, an independent communications channel is provided between the docking station and the digital video camera. In one embodiment, the independent communications channel is utilized to support low bandwidth communications, as described more fully herein.

The docking station also includes a remote control transceiver 199 that is operable to communicate with a remote control operated by a user. Commands from the remote control are received by the docking station and can be communicated to the digital video camera. In one embodiment, if the docking station is coupled to a television through a audio/video output, then commands from the remote control could be used to control the playback of video stored in the digital video camera, which is then displayed on the television. Since the docking station includes a power source, charging of batteries provided in the digital video camera can be performed while the camera is docked on the docking station.

Figure 3:
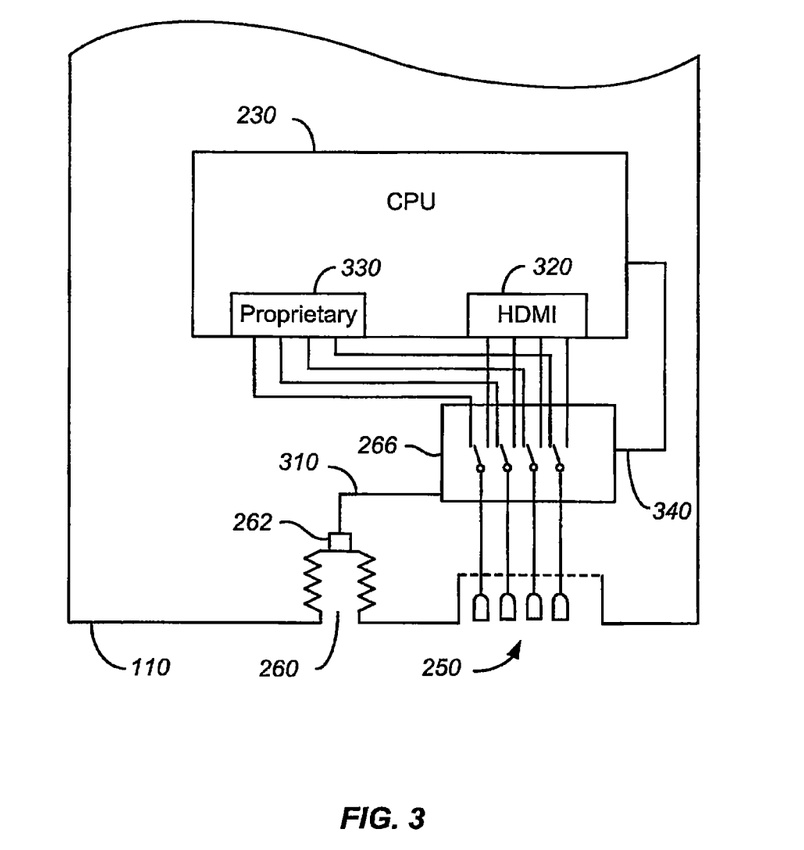
FIG. 3 is a simplified schematic diagram of a portion of a digital video camera, according to an embodiment of the present invention.

FIG. 3 is a simplified schematic diagram of a portion of a digital video camera, according to an embodiment of the present invention. A portion of the camera body 110 of the digital video camera is illustrated along with the tripod mount 260 and the first connector 250. Although the first connector 250 only include four pins, this illustration is only for clarity in the figure and a typical implementation may include additional pins or less pins provided in one or more planes of pins. Electrical connection is provided between the pins of the first connector 250 and switch 266. Connection sensor 262 is illustrated as positioned at the top of the tripod mount 260. In some embodiments, the connection sensor 262 is a moveable switch that is activated by contact with the mounting screw of the tripod. In other embodiments, it is a proximity sensor or the like. Electrical connector 310 provides for communication between the connection sensor 262 and the switch 266.

In one embodiment, actuation of the connection sensor 262 results in the switch 266 transitioning from a first state (i.e., the pass through state) to a second state (i.e., the switching state). In the first state, the electrical connectors from the first connector 250 pass through the switch 266 to the HDMI unit 320 of the CPU 230. In the second state, the electrical connectors from the first connector 250 are switched to make contact with electrical connectors connected to a proprietary unit 330 of the CPU 230. In addition to control of the switch 266 by the connection sensor 262, additional control 340 is provided by the CPU 230. Thus, in some embodiments, using the user interface of the digital video camera, control over the switch 266 can be effectuated by a user independent of the state of the connection sensor 262.

Although FIG. 3 illustrates the connection sensor 262 as integrated with the tripod mount 260, this is not required by some embodiments of the present invention and other configurations are included within the scope of embodiments of the present invention. The indication of connection can thus be provided in other manners that are independent of the first connector 250.

Figure 4:
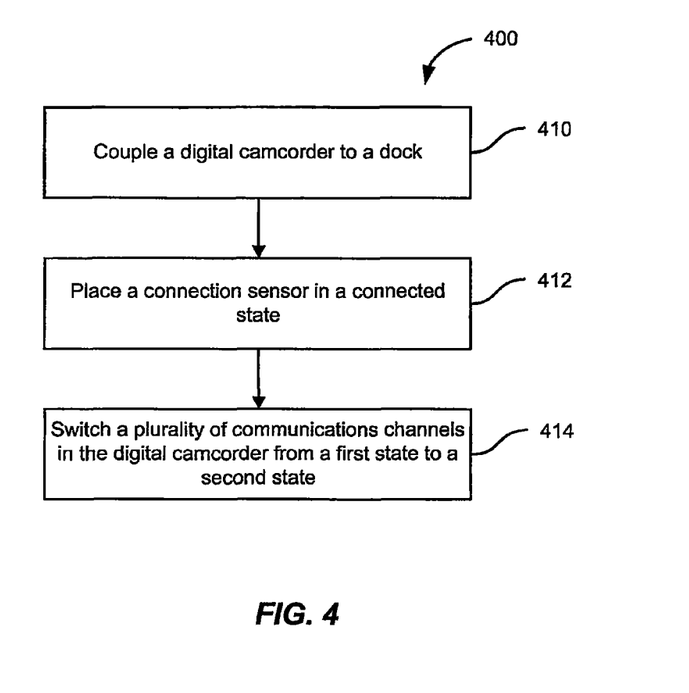
FIG. 4 is a simplified flowchart illustrating a method of operating a digital camcorder, according to an embodiment of the present invention.

FIG. 4 is a simplified flowchart illustrating a method 400 of operating a digital camcorder, according to an embodiment of the present invention. The method 400 includes coupling the digital camcorder to a dock (410). This process may also be referred to as mounting the digital camcorder on a docking station. In one embodiment, the digital camcorder includes a first communications port and a tripod mount. As illustrated in FIG. 1C and FIG. 1D, one embodiment provides the first communications port (also referred to as a first connector) and the tripod mount on a bottom surface of the digital camcorder. For example, the tripod mount may be a threaded orifice extending into a body of the digital camcorder. In a particular embodiment, the first communications port is an HDMI socket. The method 400 also includes placing a connection sensor in a connected state (412). The connection sensor is independent of the first communications port. As an example, a stud present on the docking station can extend into the tripod mount and actuate a connection sensor integrated with the tripod mount.

The method 400 further includes switching a plurality of communication channels in the digital camcorder from a first state to a second state based on the received signal (414). In one embodiment, the first state provides electrical communication between an HDMI module in the digital camcorder and the first communications port. In another embodiment, the second state provides electrical communication between a proprietary module in the digital camcorder and the first communications port. Thus, embodiments of the present invention provide a system in which a single connector provides multiple functions depending on the connection status of the digital camcorder.

It should be appreciated that the specific steps illustrated in FIG. 4 provide a particular method of operating a digital camcorder according to one embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, steps may be added or removed depending on the particular applications. One of ordinary skill in the art would recognize many variations, modifications, and alternatives.

Embodiments of the present invention provide for attachment of numerous connectors to the digital video camera. A docking station is one example of a connector that can be inserted into the data connector of the digital video camera. Other examples include:

a Bluetooth adapter that may be used to connect any Bluetooth microphone, headset, remote, or the like;

a wired cradle that may be used to synchronize a camcorder to a computer, connect to a television or other audio/video display device, and/or charge batteries present in the digital video camera;

a demonstration unit that may be used to provide power to an off-the-shelf camcorder on display at retail stores;

an external battery pack that may be used to extend the life of camcorder battery;

a light that may be used to add additional lighting to the scene being recorded or used as a flash during still photograph capture;

a microphone (either wired or wireless) that may be used to record audio (e.g., during an interview) or to enhance the audio signal from more distant sources or speakers;

a projector that may be used for video playback of video recorded on the digital video camera;

a remote control that that may be provided for enhanced or full control over the camcorder user interface, where, in some embodiments, the remote control can be used when the camcorder is mounted on a tripod and the operator desires to operate the camcorder remotely, when video is being played back on a television and the operator desires to operate the camcorder remotely, or the like;

a security camera used to record video footage, where the camcorder can be activated based on sensor inputs such as a motion sensor, at predetermined times, combinations thereof, or the like;

a storage media that may be used to offload video footage from the camcorder to an external device such as a computer or other storage device, where the docking station can provide for bi-directional communications so that media on a remote device can be stored on the camcorder or vice versa;

an underwater case used to provide a sealed enclosure while still providing for control (e.g., full control) over the camcorder functions;

a wireless power source that may be used to charge the batteries of the camcorder through an inductive or other wireless power transfer process; and/or a wireless webcam that may be used to transmit live video over a wireless connection such as WiFi.

Utilizing a docking station as described herein and a digital video camera, it is possible to provide a number of different services to users. As examples, the following services are included within the scope of embodiments of the present invention:

Audio In: The ability to send an audio signal into camcorder from a remote source;

Command/Control: The ability to provide for control (e.g., full control) over the camcorder; depending on the functions available to the user, this control can include a subset of the available commands, maintaining some commands as exclusive to the manufacturer;

Data In: The ability to write data to memory present in the camcorder; this functionality is similar to the use of the attached USB connector to transfer media to the camcorder;

Data Out: The ability to read data from the camcorder; this functionality is similar to the use of the attached USB connector to transfer media to the camcorder;

HDMI out: The ability to transmit audio and video from the camcorder to an external device in a manner compliant with the HDMI standard;

Power In: The ability to provide power to the camcorder; power can be used to power the camcorder during operation, to charge batteries present in the camcorder, combinations thereof, or the like;

Power On/Off: The ability to turn the camcorder on and off;

Power Out: The ability to provide power to support operation and charging of the camcorder and an attached device;

On-screen menus: The ability of a user to interact with menus associated with the user interface of the camcorder; this ability can enable provision of reduced functionality user interfaces on the camcorder (i.e., a simplified device) and still enable a user to access user interfaces with enhanced and/or full functionality; and/or Data collection: The ability to capture device identification information for storage as video metadata; reporting associated with video capture as well as camcorder functionality can be enhanced using this service.

Figure 5:
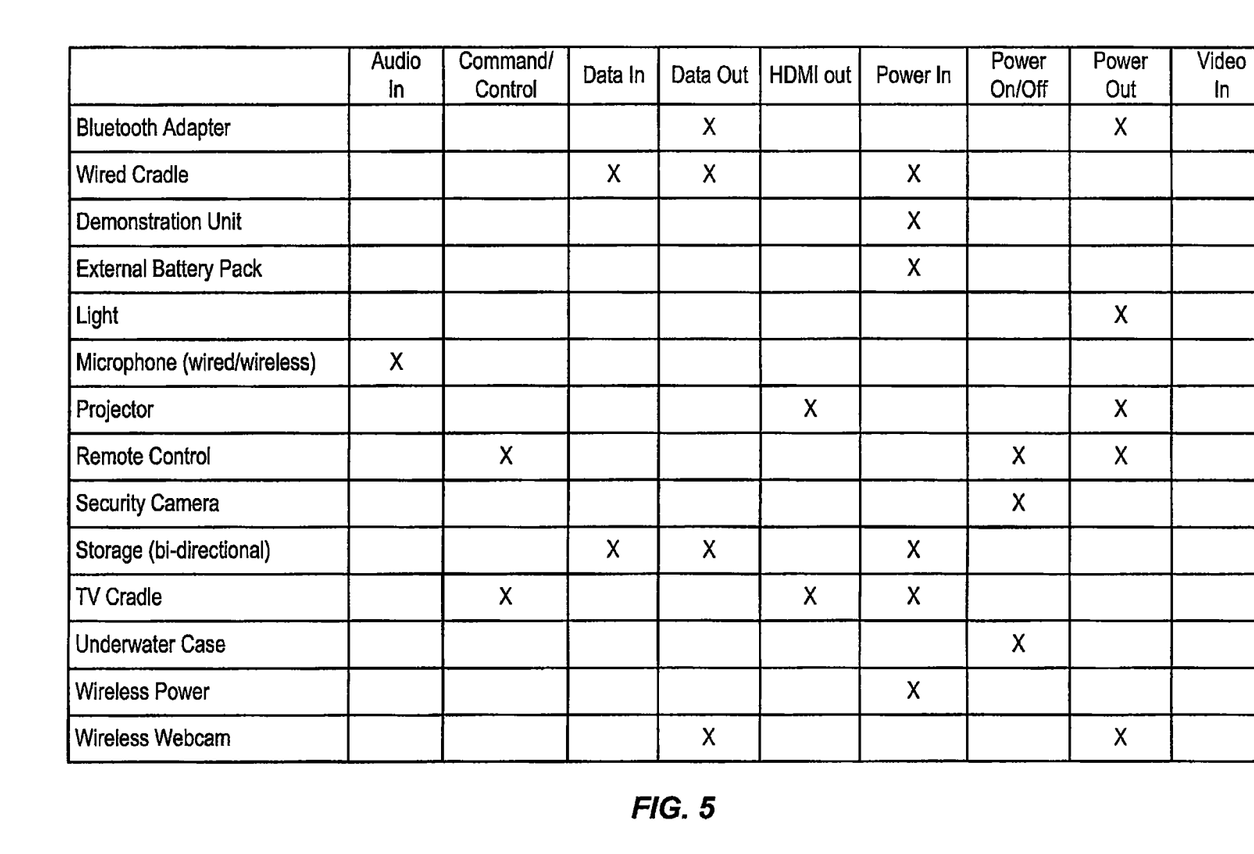
FIG. 5 is a simplified table illustrating services provided by embodiments of the present invention for various attached devices.

FIG. 5 is a simplified table illustrating services provided by embodiments of the present invention for various attached devices. For each of the potential attached devices, the services enabled by some embodiments of the present invention are indicated. The matches between devices and services illustrated in FIG. 5 are not intended to limit the scope of embodiments of the present invention, but to merely indicate potential matches. Other matches are included in other embodiments. One of ordinary skill in the art would recognize many variations, modifications, and alternatives.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:
1. A digital device, comprising:
a processor that includes a first unit configured to receive signals in accordance with a first communications protocol and a second unit configured to receive signals in accordance with a second communications protocol;

a data connector coupled to the processor and operable in accordance with the first communications protocol, wherein the data connector is made operable in accordance with the second communications protocol by modifying a function associated with one or more pins of the data connector from a standard function to a proprietary function;

a switch coupled to the data connector and configured to further couple the data connector to either the first unit or the second unit; and a sensor coupled to the switch, wherein upon activation of the sensor, a switching signal is transmitted from the sensor to the switch that causes the switch to uncouple the data connector from the first unit and couple the data connector to the second unit to make the data connector operable in accordance with the second communications protocol.

2. The digital device of claim 1, wherein the digital device comprises a digital video camera.

3. The digital device of claim 1, wherein the data connector comprises a High-Definition Multimedia Interface (HDMI) data connector, and wherein the first communications protocol comprises a standard HDMI protocol and the second communications protocol comprises a proprietary protocol.

4. The digital device of claim 1, further comprising a tripod mount coupled to the sensor, wherein the sensor is activated when a portion of a protuberance is inserted into the tripod mount.

5. The digital device of claim 1, wherein the switching signal is transmitted when a physical object is contacted to the sensor.

6. The digital device of claim 1, wherein the switching signal is transmitted when a wireless signal is received by the sensor from another device.

7. The digital device of claim 1, wherein the data connector is located on a bottom portion of the digital device and comprises a female data connector.

8. The digital device of claim 1, wherein fewer pins are used for communications functions when the data connector is operable in accordance with the second communications protocol relative to when the data connector is operable in accordance with the first communications protocol.

9. The digital device of claim 1, wherein power for recharging the digital device is provided using a first set of pins when the data connector is operable in accordance with the second communications protocol, and wherein at least one pin included in the first set of pins is not used for recharging the digital device when the data connector is operable in accordance with the first communications protocol.

10. The digital device of claim 1, further comprising another data connector coupled to the processor.

11. The digital device of claim 1, wherein the data connector comprises a first data connector and a second data connector.

12. A connector configured to be coupled to a digital device, the connector comprising:

a first male data connector portion configured to be coupled to a first female data connector portion included in the digital device, wherein the first male data connector portion and the first female data connector portion are operable using a first communications protocol; and a protuberance configured to be coupled to a tripod mount included in the digital device, wherein a sensor coupled to the tripod mount is activated upon coupling of the protuberance and the tripod mount, causing the first male data connector portion and the first female data connector portion to become operable using a second communications protocol.

13. The connector of claim 12, further comprising a second male data connector portion configured to be coupled to a second female data connector portion included in the digital device.

14. The connector of claim 13, wherein the second male data connector portion comprises a Universal Serial Bus (USB) data connector.

15. The connector of claim 13, wherein a combination of the first male data connector portion, the second male data connector portion, and a spatial orientation of the second male data connector portion relative to the first male data connector portion comprises a proprietary data connector.

16. The connector of claim 13, wherein concurrent connection of the first male data connector portion with the first female data connector portion and the second male data connector portion with the second female data connector portion causes at least one of the first data male connector portion or the second male data connector portion to operate in accordance with a proprietary communications protocol.

17. A method for routing signals, the method comprising:

routing a first signal received via a communications port included in a digital device to a first unit associated with a processor included in the digital device, wherein the first signal complies with a first communications protocol and corresponds to operating the digital device in a first mode;

receiving a switching signal indicating that the digital device is to be converted from operating in the first mode to operating in a second mode; and in response to receiving the switching signal, routing a second signal received via the communications port to a second unit associated with the processor, wherein the second signal complies with a second communications protocol and corresponds to operating the digital device in the second mode, wherein a function associated with one or more pins of the communications port comprises a standard function when operating the digital device in the first mode and comprises a proprietary function when operating the digital device in the second mode.

18. The method of claim 17, wherein the communications port comprises a High-Definition Multimedia Interface (HDMI) data connector, and wherein the first communications protocol comprises a standard HDMI protocol and the second communications protocol comprises a proprietary protocol.

19. A digital device, comprising:

a processor that includes a first unit configured to receive signals in accordance with a first communications protocol and a second unit configured to receive signals in accordance with a second communications protocol;

a data connector coupled to the processor and operable in accordance with the first communications protocol;

a switch coupled to the data connector and configured to further couple the data connector to either the first unit or the second unit;

a sensor coupled to the switch, wherein upon activation of the sensor, a switching signal is transmitted from the sensor to the switch that causes the switch to uncouple the data connector from the first unit and couple the data connector to the second unit to make the data connector operable in accordance with the second communications protocol; and a tripod mount coupled to the sensor, wherein the sensor is activated when a portion of a protuberance is inserted into the tripod mount.

\* \* \* \* \*